(12) United States Patent
Hisamatsu

(10) Patent No.: US 6,206,491 B1
(45) Date of Patent: Mar. 27, 2001

(54) CRAWLER DEVICE FOR CRAWLER VEHICLE

(75) Inventor: Kenichi Hisamatsu, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/319,394

(22) PCT Filed: Dec. 8, 1997

(86) PCT No.: PCT/JP97/04493

§ 371 Date: Jun. 3, 1999

§ 102(e) Date: Jun. 3, 1999

(87) PCT Pub. No.: WO98/25809

PCT Pub. Date: Jun. 18, 1998

(30) Foreign Application Priority Data

Dec. 13, 1996 (JP) .................................... 8-352886

(51) Int. Cl.$^7$ ..................................... B60S 1/62
(52) U.S. Cl. ................ 305/103; 305/118; 305/202
(58) Field of Search ............................ 305/100, 102, 305/104, 103, 106, 202, 59, 118

(56) References Cited

U.S. PATENT DOCUMENTS

| | | | |
|---|---|---|---|
| 4,126,359 | * 11/1978 | Holze | 305/103 X |
| 5,069,509 | * 12/1991 | Johnson et al. | 305/104 X |
| 5,183,318 | * 2/1993 | Taft et al. | 305/104 X |

FOREIGN PATENT DOCUMENTS

| | | |
|---|---|---|
| 55-110383 | 8/1980 | (JP) . |
| 59-18676 | 2/1984 | (JP) . |
| 60-166572 | 8/1985 | (JP) . |
| 1-172983 | 12/1989 | (JP) . |
| 6-504747 | 6/1994 | (JP) . |

* cited by examiner

Primary Examiner—Russell D. Stormer
(74) Attorney, Agent, or Firm—Sidley & Austin

(57) ABSTRACT

As well as a torsional rigidity of right and left crawler links is secured, a seal is prevented from damaging so as to restrict a leakage of a lubricating oil, so that a durability of a crawler device is improved. In order to achieve this, a crawler device for a crawler vehicle comprising a pin (10) and a stationary bush (11) for connecting a right row of crawler link (8) and a left row of crawler link (9) adjacent in a longitudinal direction, and a rotating bush (12) outward fitted to the stationary bush in a freely rotatable manner and meshed with teeth of a drive wheel (5) comprises support members (13, 13) respectively inserted to the right and left rows of crawler links, each having an outer diameter portion (13d, 13d) press fitted to a second connection end portion (8b, 9b) of each of the crawler links and an inner cylinder portion (13e, 13e) to which the stationary bush (11) is press fitted and formed in a bracket-shaped cross sectional ring, a first seal (14, 14) inserted between an outer end portion (13a, 13a) of each of the support members and the opposing crawler links, and a second seal (15, 15) inserted between an inner end portion (13b, 13b) and both end portions of the opposing rotating bushes.

12 Claims, 6 Drawing Sheets

CRAWLER DEVICE FOR CRAWLER VEHICLE

FIELD OF THE INVENTION

The present invention relates to a crawler device for a crawler vehicle such as a bulldozer and the like, and more particularly, to a crawler device for a crawler vehicle which improves a support member for a lubricating oil seal, an oil groove and the like in a crawler link connection portion.

BACKGROUND ART

A conventional crawler device for a crawler vehicle is provided with right and left crawler links for fastening a multiplicity of crawler plates arranged in a longitudinal direction of a crawler.

The multiplicity of arranged right and left crawler links are overlapped and connected by press fitting a pin and a stationary bush. Then, it has been structured such as to mesh teeth of a drive wheel with an outer diameter portion of the stationary bush so as to rotate, however, since the outer diameter portion of the stationary bush is worn away, a crawler device in which a rotating bush is outwardly fitted to the stationary bush has been developed in recent days.

As a prior art of the crawler device using the rotating bush, there is, for example, Japanese Unexamined PCT Publication No. 6-504747. The contents thereof is structured such that stationary bushes 110 and 110 are respectively press fitted to right and left crawler links 80a and 80b, as shown in FIG. 9.

A rotating bush 120 is provided in a center portion between the left stationary bush 110 and the right stationary bush 110, and the structure is made such as to be separated into three portions.

The center rotating bush 120 meshed with the teeth of the drive wheel (not shown) can rotate around a pin 100. A portion between an inner cylinder surface of the center rotating bush 120 and an outer diameter portion of the pin 100 are lubricated by an oil, and each of seals 150 and 150 is provided between right and left end surfaces of the rotating bush 120 and each of the stationary bushes 110 and 110. Each of seals 140 and 140 is provided outside each of the stationary bushes 110 and 110. Oil grooves 101 and 102 are provided in an inner portion of the pin 100.

However, in accordance with the technique described in this publication, since each of the seals 150 and 150 is arranged in both end portions of the rotating bush 120, it is unavoidable to reduce a length or a volume of press fitting between the right and left crawler links 80a and 80b and each of the stationary bushes 110 and 110. Further, since the right and left crawler links 80a and 80b are press fitted and fixed by two stationary bushes 110 and 110 not by single one, there is no bush for combining and connecting between the right crawler link 80a and the left crawler link 80b, so that a torsional rigidity between the right and left crawler links 80a and 80b is significantly reduced. Accordingly, there are problems that a holding force due to a press fitting is insufficient against an external force during an operation, a clearance (an end play) of each of seals 140 and 150 at an initial time of assembly is expanded and a sealed lubricating oil is leaked from each of the seals 140 and 150.

Further, a lubrication between the pin 100 and the rotating bush 120 is insufficient, so that there is a problem that they seize and an endurance life is reduced.

Still further, since the right and left crawler links 80a and 80b are twisted due to the external force applied during the operation, there is a problem that the pin 100, each of the stationary bushes 110 and 110, the rotating bushes 120 and the like are worn away, so that a durability of the crawler device is reduced.

SUMMARY OF THE INVENTION

The present invention is made by paying attention to the conventional problems mentioned above, and an object of the present invention is to provide a crawler device for a crawler vehicle in which a torsional rigidity of a crawler link is secured, a clearance (an end play) of a seal against an external force during an operation maintains an initial value at an assembling time and a lubricating oil sealed in a pin does not leak from the seal.

In accordance with a first invention, there is provided a crawler device for a crawler vehicle comprising a pin and a stationary bush for connecting a right row of crawler link and a left row of crawler link adjacent in a longitudinal direction, and a rotating bush outward fitted to the stationary bush in a freely rotatable manner and meshed with teeth of a drive wheel, wherein the improvement comprises support members respectively inserted to the right and left rows of crawler links, each having an outer diameter portion press fitted to a second connection end portion of each of the crawler links and an inner cylinder portion to which the stationary bush is press fitted and formed in a bracket-shaped cross sectional ring, a first seal inserted between an outer end portion of each of the support members and the opposing crawler links, and a second seal inserted between an inner end portion of each of the support members and both end portions of the opposing rotating bushes.

In accordance with the structure mentioned above, since each of the support members is structured such that the outer diameter portion is press fitted to the second connection end portions of the right and left crawler links and the stationary bush is press fitted to the inner cylinder portion, a torsional rigidity of the right and left rows of crawler links can be secured. Accordingly, a clearance (an end play) of the first and second seals can maintain the initial value at assembling against an external force during an operation. Therefore, the lubricating oil sealed in the pin does not leak from the first and second seals, so that a durability of the seal and a durability of the crawler device are improved.

In accordance with a second invention, there is provided a crawler device for a crawler vehicle as cited in the first invention; wherein the each of support members is a support member formed in a multi-step shaped ring provided with a flange portion brought into contact with an outer peripheral portion of the second seal in an inner end portion thereof.

In accordance with the structure mentioned above, since it is structured such that the flange portion of each of the support members is further brought into contact with the outer peripheral portion of the second seal, a clearance (an end play) of the second seal can securely maintain the initial value at assembling against the external force during the operation. Accordingly, a durability of the seal and a durability of the crawler device can be improved.

In accordance with a third invention, there is provided a crawler device for a crawler vehicle as cited in the first invention or the second invention, wherein each of the support member is structured such that an outer end portion thereof is attached between the right and left rows of crawler links and the stationary bush and an inner end portion is attached between the crawler links and the rotating bushes.

In accordance with the structure mentioned above, since the outer end portion and the inner end portion of each of the support members are attached between the crawler links, the stationary bush and the rotating bush, each of the support members can not slip away against the external force during the operation. Accordingly, the torsional rigidity of the right and left crawler links 8 and 9 can be sufficiently secured and a clearance (an end play) of the seal can maintain an initial value at assembling in a more secure manner. Therefore, a durability of the crawler device is improved and the lubricating oil sealed in the pin does not leak from the seal.

In accordance with a fourth invention, there is provided a crawler device for a crawler vehicle as cited in the first invention, wherein the right and left end portions of the pin which overlaps and press fits the first connection end portion and the second connection end portion of the right and left rows of crawler links are structured such that each of stop rings for preventing a slip away is fitted.

In accordance with the structure mentioned above, even when a great external force is applied to the press fitted portion between the pin and the right and left rows of crawler links, the slipping away of the pin in a lateral direction can be prevented by each of the stop rings. Accordingly, a clearance (an end play) of the seal can maintain the initial value at assembling against the external force during the operation in a more secure manner, so that a durability of the seal can be improved.

In accordance with a fifth invention, there is provided a crawler device for a crawler vehicle as cited in the first invention, wherein the stationary bush is structured such that a first oil groove is formed in a side receiving a force Fl applied from the drive wheel and an outer diameter portion oh an opposite side, and second and third oil grooves communicating with the first oil groove are formed in both end portions.

In accordance with the structure mentioned above, since the first, second and third oil grooves are continuously formed at the position where the force Fl is not directly operated from the drive wheel in the outer diameter portion of the stationary bush, a crack and the like of the stationary bush are not generated, so that a durability is improved. Further, since the lubricating oil is supplied to all the outer peripheral surface of the stationary bush through the oil grooves, the pin, the stationary bush and the rotating bush do not seize, so that a durability can be improved.

BEST MODE FOR CARRYING OUT THE INVENTION

Hereinafter, a crawler device for a crawler vehicle in accordance with an embodiment of the present invention will be described below with reference to FIGS. 1 to 8.

Figure 8:
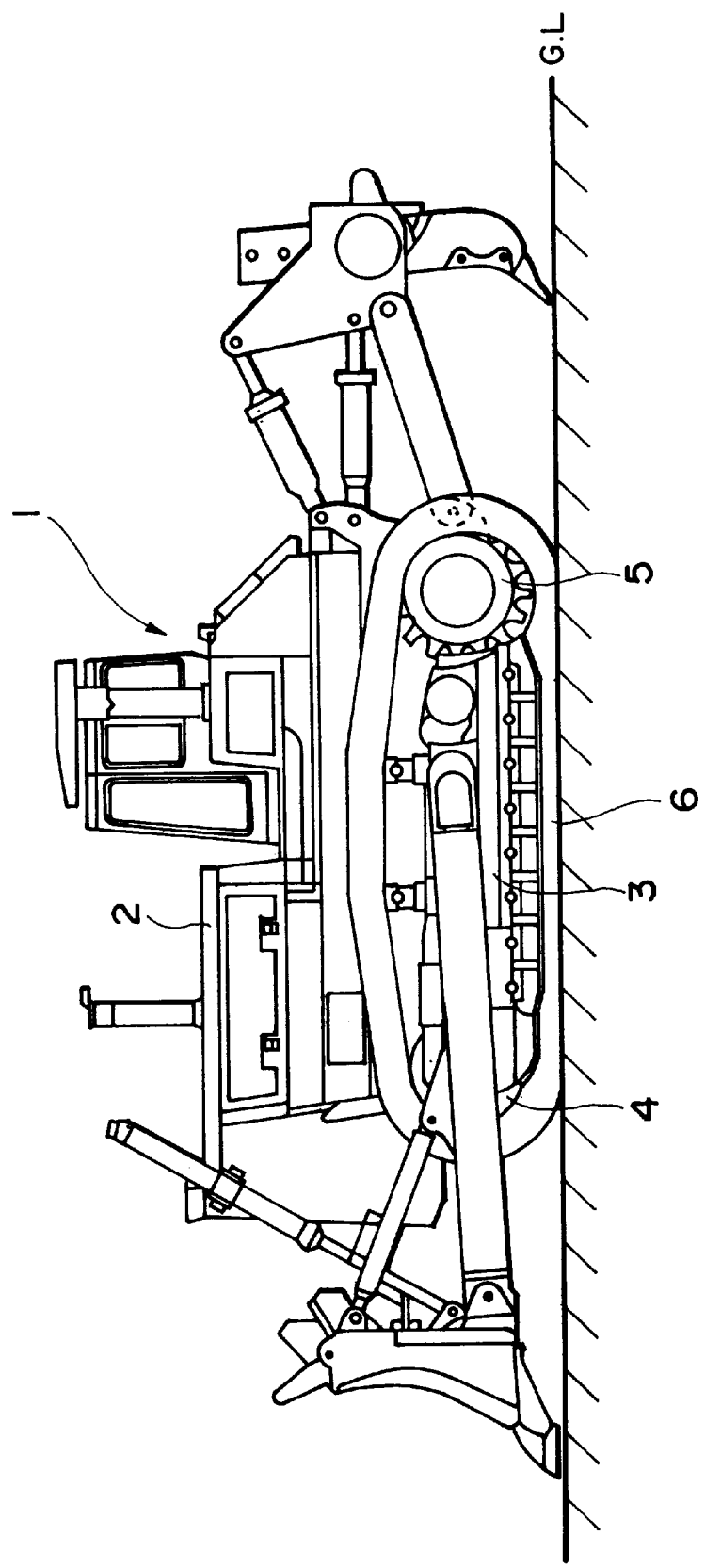
FIG. 8 is a side elevational view of a whole of a bulldozer.
Figure 9:
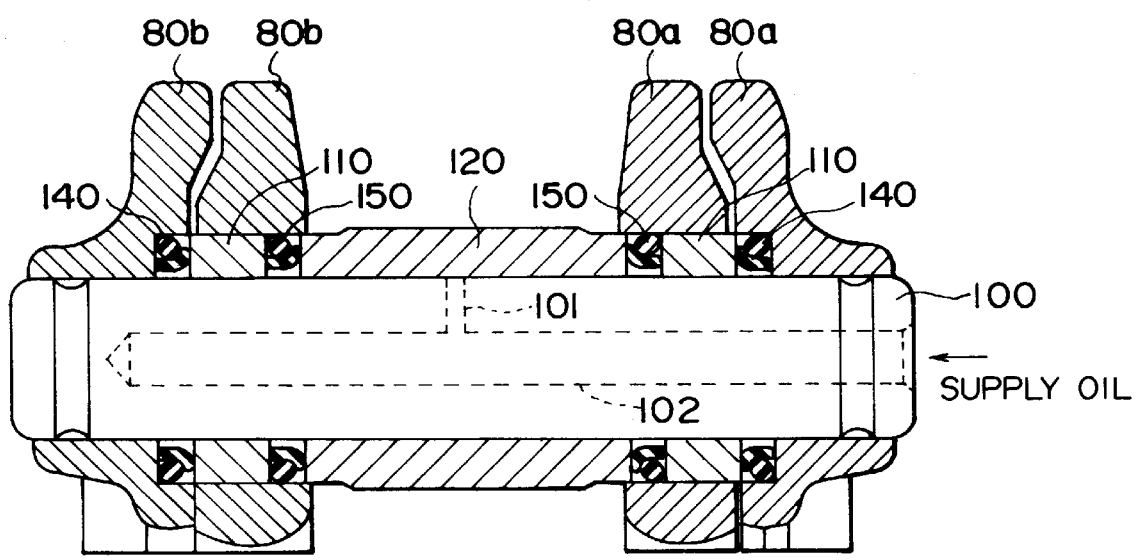
FIG. 9 is a side elevational cross sectional view which shows a connection state of a crawler link in accordance with a conventional art.

At first, a bulldozer 1 as an embodiment of a crawler vehicle will be described below with respect to FIG. 8. A vehicle body 2 is connected to right and left truck frames 3 and 3. Respective free wheels 4 and 4 and a plurality of lower rotating wheels are attached to the truck frames 3 and 3. Further, respective drive wheels 5 and 5 connected to a drive apparatus (not shown) are arranged in the vehicle body 2. Respective crawlers 6 and 6 wind around the respective free wheels 4 and 4, a plurality of lower rotating wheels and the respective drive wheels 5 and 5 so as to constitute an endless track band.

Figure 1:
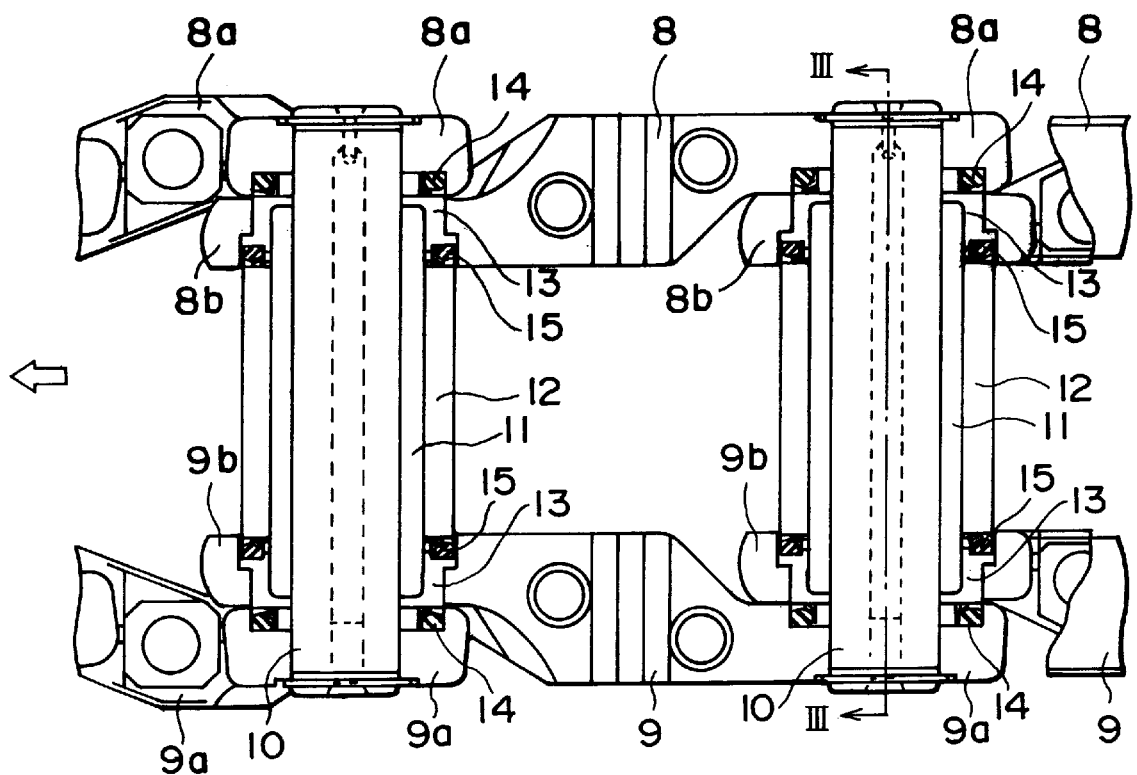
FIG. 1 is a plan view which shows a crawler link connection state in a crawler device for a crawler vehicle in accordance with an embodiment of the present invention.

Next, the crawler device in accordance with the present embodiment will be described below with reference to FIGS. 1 to 3. FIG. 1 is a plan view of a plurality of crawler links 8, 8, 9 and 9 as seen from a side of a non-grounded surface, and shows crawler links 8 and 8 adjacent in a longitudinal direction at the right row and crawler links 9 and 9 adjacent in a longitudinal direction at the left row.

A first connection end portion 8a and a second connection end portion 8b in which connection holes are provided at both ends are formed in the right row of crawler link 8. As shown in FIG. 1, the second connection end portion 8b of the right row of crawler link 8 and the first connection end portion 8a of the adjacent crawler link 8 are overlapped in an inner side and an outer side, respectively.

In the same manner, a first connection end portion 9a and a second connection end portion 9b in which connection holes are provided at both ends are formed in the left row of crawler link 9. As shown in FIG. 1, the second connection end portion 9b of the left row of crawler link 9 and the first connection end portion 9a of the adjacent crawler link 9 are overlapped in an inner side and an outer side, respectively.

The crawler links 8, 8, 9 and 9 in the right and left rows respectively overlap the first and second connection end portions 8a, 8b, 9a and 9b and attaches a stationary bush 11, a rotating bush 12 and first and second seals 14, 14, 15 and 15 so as to be connected by pins 10, respectively.

Figure 2:
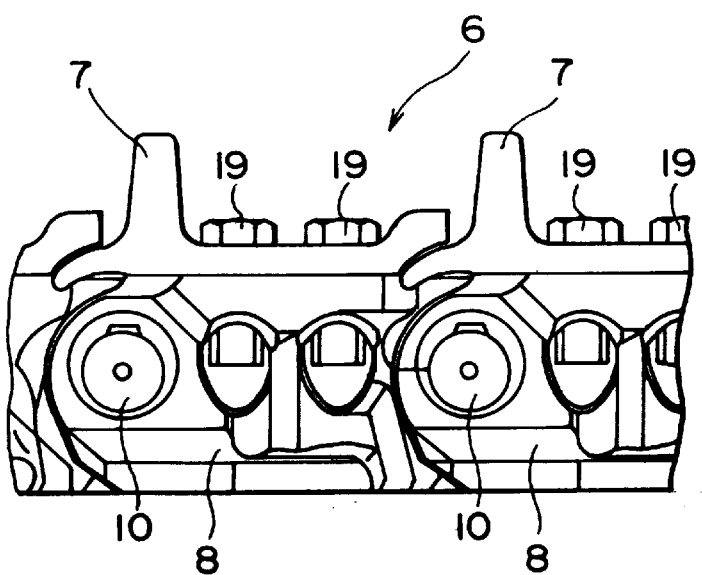
FIG. 2 is a side elevational view of the crawler device in FIG. 1.
Figure 3:
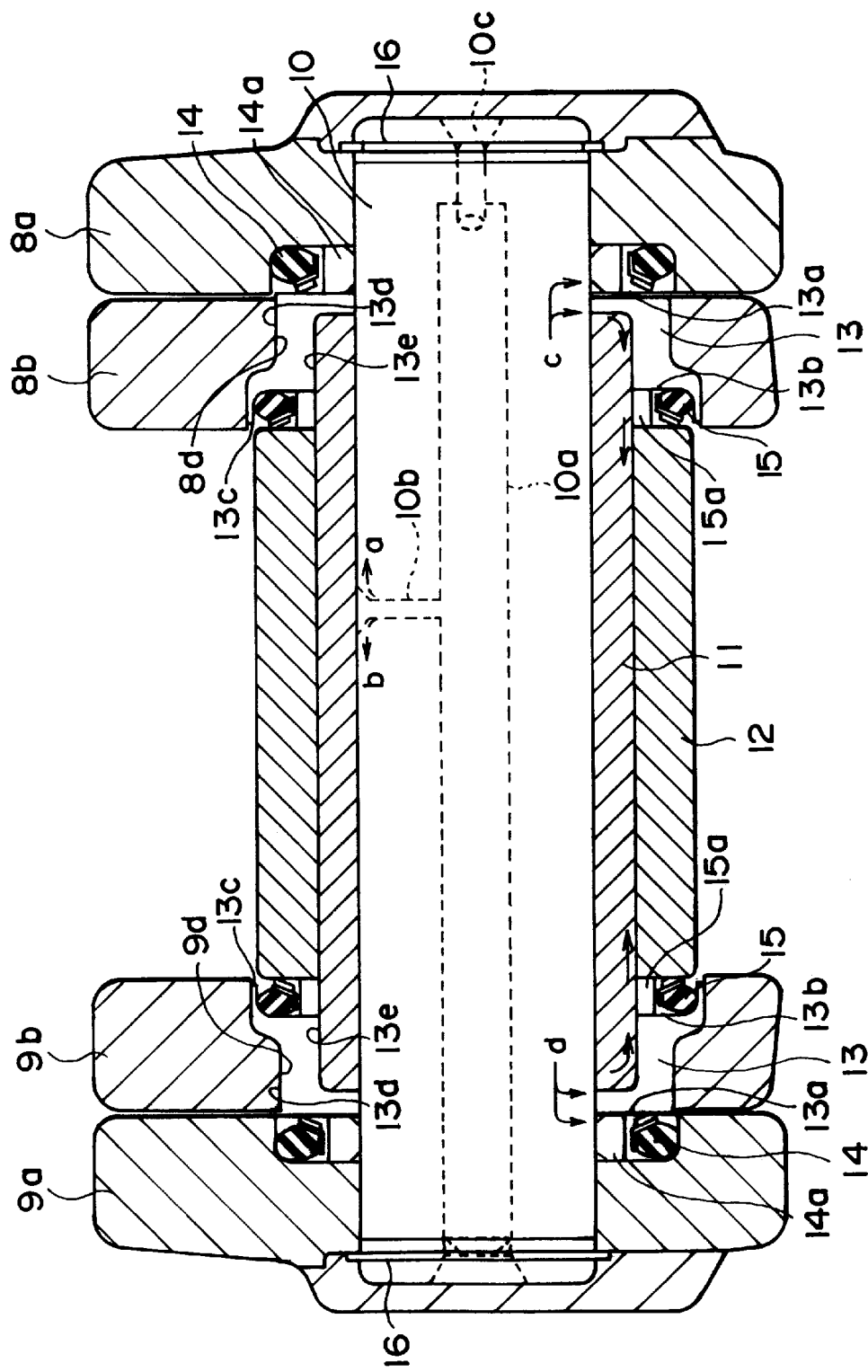
FIG. 3 is an enlarged view of a cross section along a line III—III in FIG. 1.

FIG. 2 shows a side surface of the right row of crawler links 8 and 8. Crawler plates 7 and 7 are fastened to the crawler links 8 and 8 via a plurality of bolts 19 and 19. The left row of crawler links 9 and 9 are structured in the same manner, so that an explanation will be omitted. As mentioned above, an endless track band constituted by connecting a multiple of right and left rows of adjacent crawler links 8, 8, 9 and 9 in a longitudinal direction is called as right and left rows of crawlers 6 and 6.

Next, details of the connection portion of the right and left crawler links 8, 8, 9 and 9 will be described below with reference to FIG. 3.

An outer diameter portion 13d of a support member 13 formed in a bracket-shaped cross sectional ring is press fitted to a connection hole 8d formed in the second connection end portion 8b of the right row of crawler link 8. An outer diameter portion of a stationary bush to which a rotating bush 12 is outwardly fitted is press fitted to an inner cylinder portion 13e of the support member 13.

An annular second seal 15 and a second thrust ring 15a are arranged in an inner end portion 13b of the support member in such a manner as to be brought into contact therewith. The second seal 15 and the second thrust ring 15a are brought into contact with a right end portion of the rotating bush 12 shown in FIG. 3. An annular first seal 14 and a first thrust ring 14a are brought into contact with an outer end portion 13a of the support member 13. The first seal 14 and the first thrust ring 14a are arranged in the outer end portions 8a of the adjacent crawler links 8.

In the same manner, an outer diameter portion 13d of the support member 13 of the bracket-shaped ring is press fitted to a connection hole 9d formed in the second connection end portion 9b in the left row of crawler link 9. An outer diameter portion of the stationary bush 11 to which the rotating bush 12 is outward fitted is press fitted to an inner cylinder portion 13e of the support member 13.

An annular second seal 15 and a second thrust ring 15a are arranged in an inner end portion 13b of the support member in such a manner as to be brought into contact therewith. The second seal 15 and the second thrust ring 15a are brought into contact with a left end portion of the rotating bush 12 shown in FIG. 3. An annular first seal 14 and a first thrust ring 14a are brought into contact with an outer end portion 13a of the support member 13. The first seal 14 and the first thrust ring 14a are arranged in the outer end portions 9a of the adjacent crawler links 9.

Further, each of the support members 13 and 13 may be formed in a multi-step shaped ring provided with flange portions 13c and 13c brought into contact with an outer peripheral portion of the second seals 15 and 15 in the inner end portions 13b and 13b. In accordance with the structure mentioned above, it is structured such that each of the support members 13 and 13 can not be easily slipped away against a thrust force applied to the crawler. Then, it is structured such that the outer end portions 13a and 13a of the respective support members 13 and 13 are held between the right and left rows of crawler links 8 and 9 and the stationary bush 11 and the inner end portions 13b and 13b of the support member 13 are also held between the right and left rows of crawler links 8 and 9 and the rotating bush 12.

Further, respective stop rings 16 and 16 for preventing a slip away are fitted in right and left end portions of the pin 10 press fitted after overlapping the first connection end portions 8a and 9a and the second connection end portions 8b and 9b of the respective right and left rows of crawler links 8 and 9.

Next, an explanation will be given of a passage of a lubricating oil in the connection pin 10, the stationary bush 11 and the rotating bush 12 of the crawler link shown in FIG. 3.

An oil supply port 10c is formed in the connection pin 10, and a main passage 10a communicated with the oil supply port 10c and a branch passage 10b branched from a portion near a center of the main passage 10a are formed. An oil supplied from the oil supply port 10c is branched from the main passage 10a into a direction of an arrow a and an arrow b through the branch passage 10b, and flows between the outer peripheral portion of the pin 10 and the inner cylinder portion of the stationary bush 11. The oil lubricating them flows between the outer peripheral portion of the stationary bush 11 and the inner cylinder portion of the rotating bush 12 from directions of arrows c and d described in right and left of the pin 10, and lubricates them. The first seals 14 and 14 and the second seals 15 and 15 are arranged so as not to leak the oil for lubricating the pin 10, the stationary bush 11 and the rotating bush 12.

The, first, second and third oil grooves 11a, 11b and 11c formed in the stationary bush 11 will be described below with reference to FIGS. 4 and 5.

Figure 4:
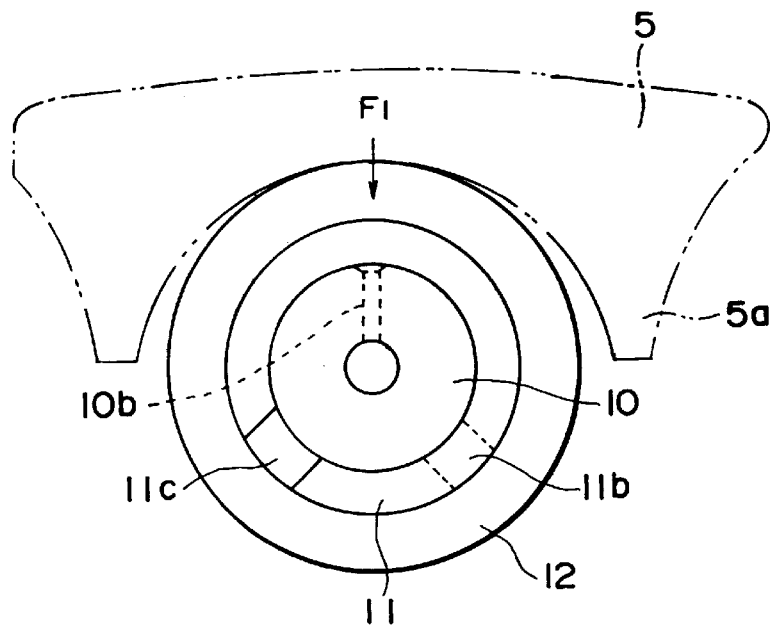
FIG. 4 is a side elevational view which shows an arrangement of teeth of a drive wheel, a rotating bush, a stationary bush and a pin.
Figure 5:
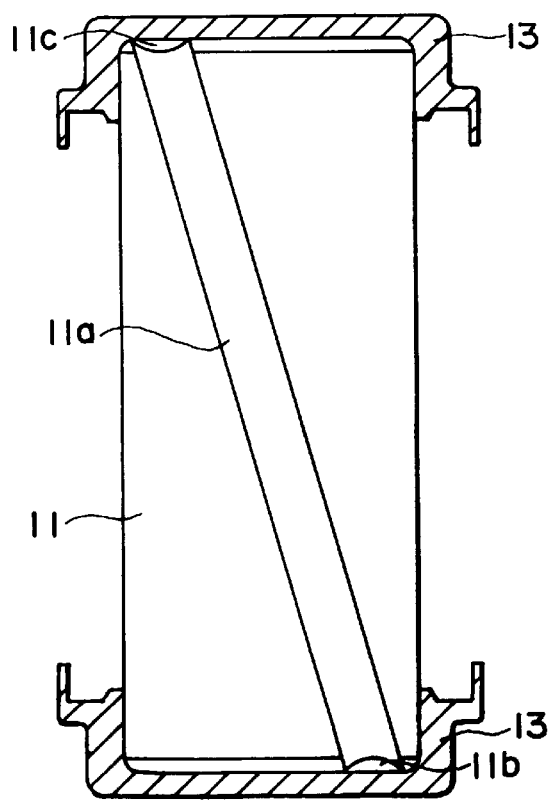
FIG. 5 is a plan view which shows an oil groove provided in the stationary bush.

FIG. 4 shows side surfaces of the rotating bush 12 meshed with teeth 5a of the drive wheel 5, the stationary bush 11 and the pin 10, and FIG. 5 shows the first, second and third oil grooves 11a, 11b and 11c formed on the outer peripheral portion of the stationary bush 11. These oil grooves 11a, 11b and 11c are formed in a side opposite to a position at which the force Fl applied when the teeth 5a of the drive wheel 5 is meshed with the rotating bush 12 is operated. Further, the first oil groove 11a is formed, as shown in FIG. 5, in such a manner as to communicate all around the length of the stationary bush 11 in a longitudinal direction.

Next, an operation of the present embodiment will be described below with reference to FIGS. 1 to 5.

In the respective support members 13 and 13 press fitted to the second connection end portions 8b and 9b of the right and left crawler links 8 and 9, since the stationary bush 11 is press fitted to the inner cylinder portions 13e and 13e thereof, a torsional rigidity of the right and left crawler links 8 and 9 is sufficiently secured. Accordingly, with respect to an external force during an operation, a clearance (an end play) of the first seals 14 and 14 and the second seals 15 and 15 can maintain an initial value at assembling. Therefore, the lubricating oil sealed in the pin 10 does not leak from the first seals 14 and 14 and the second seals 15 and 15, so that a durability between the seals and the crawler device can be improved.

Further, since the respective support members 13 and 13 are formed in the multi-step shaped ring provided with the respective support members flange portions 13c and 13c, the respective support members 13 and 13 do not slip away due to the external force during the operation. Still further, the respective support members 13 and 13 are held between the right and left rows of crawler links 8 and 9 and the stationary bush 11 and the rotating bush 12 from right and left directions, a clearance (an end play) of the first seals 14 and 14 and the second seals 15 and 15 can maintain the initial value at assembling. Accordingly, an assembling size of the first seals 14 and 14 and the second seals 15 and 15 is definitely determined, and it is easy to control a seal clearance (an end play) when assembling.

Further, even when a great external force acts on the press-fitted portion between the pin 10 and the right and left crawler links 8 and 9, the pin 10 is prevented from slipping away in a lateral direction by the respective stop rings 16 and 16. Accordingly, since a clearance (an end play) of the first seals 14 and 14 and the second seals 15 and 15 can maintain the initial value at assembling with respect to the external force during the operation, a durability of the seal can be improved.

Still further, since in the outer diameter portion of the stationary bush 11, the first, second and third oil grooves 11a, 11b and 11c are provided at the position where the force Fl directly applied from the drive wheel 5 does not act, a crack and the like are not generated in the stationary bush 11, so that the durability is improved. In addition, on the outer periphery of the stationary bush 11, the first oil groove 11a is obliquely formed from the left upper end portion to the right lower end portion, as shown in FIG. 5. Continuous with the first oil groove 11a, the second and third oil grooves 11b and 11c are formed at both end portions thereof. Accordingly, the lubricating oil passes through the respective oil grooves 11a, 11b and 11c so as to lubricate all the surface of the outer periphery of the stationary bush 11.

Therefore, the pin 10, the stationary bush 11 and the rotating bush 12 do not seize, and the durability thereof is improved.

Figure 6:
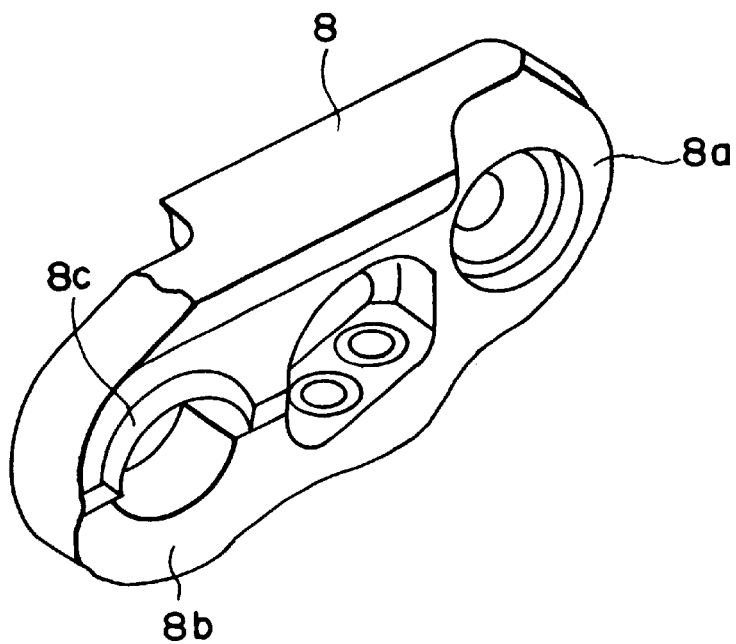
FIG. 6 is a perspective view of a crawler link in which an earth and sand prevention protruding portion is integrally formed.
Figure 7:
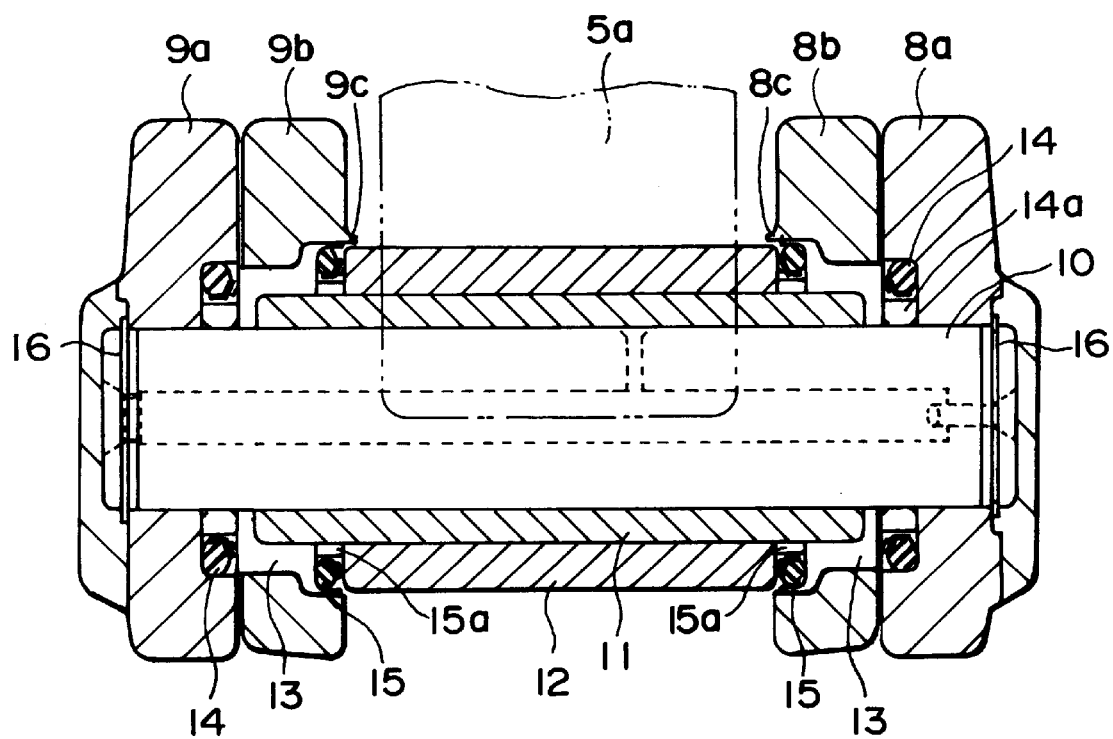
FIG. 7 is a side elevational cross sectional view showing a crawler link in which the earth and sand prevention protruding portion is integrally formed.

Next, an applied embodiment structured such that a protruding portion for preventing earth and sand is formed in the right and left crawler links 8 and 9 will be described below with reference to FIGS. 6 and 7. In this case, the elements to which the same reference numerals as those in FIGS. 1 to 4 are attached have the same functions, and an explanation here will be omitted.

A protruding portion 8c for preventing earth and sand is integrally formed in an upper portion of the second connection end portion 8b of the crawler link 8. In this case, the crawler link 9 has the same structure. Then, the protruding portions 8c and 9c for preventing earth and sand are integrally formed in the second connection end portions 8b and 9b of the right and left crawler links 8 and 9, as shown in FIG. 7. The teeth 5a of the drive wheel 5 is structured such as to be meshed with the rotating bush 12 so as to drive, as explained in FIG. 4.

Next, an operation of the present applied embodiment will be described below. The second connection end portions 8b and 9b of the right and left crawler links 8 and 9 opposing to the teeth 5a of the drive wheel 5 have the integrally formed protruding portions 8c and 9c for preventing earth and sand. The protruding portions 8c and 9c for preventing earth and sand prevent the earth and sand involved up by the drive wheel 5 from entering into the second seals 15 and 15 when the teeth 5a of the drive wheel 5 is meshed with the rotating bush 12 so as to drive. Accordingly, since the second seals 15 and 15 are not damaged by the earth and sand, the durability of the seal is further improved.

INDUSTRIAL APPLICABILITY

The present invention is useful for a crawler device for a crawler vehicle such as a bulldozer and the like, in which a torsional rigidity of the crawler link can be secured, a seal clearance can maintain an initial value at assembling with respect to an external force during an operation and a lubricating oil sealed in a pin is not leaked from a seal.

What is claimed is:

1. A crawler device for a crawler vehicle comprising a pin and a stationary bush for connecting a right row of crawler links and a left row of crawler links adjacent in a longitudinal direction, each of the crawler links having a first connection end portion and a second connection end portion, and a rotating bush outwardly fitted to the stationary bush in a freely rotatable manner to mesh teeth of a drive wheel, wherein the improvement comprises:

support members respectively inserted into said right and left rows of crawler links, each support member having an outer diameter portion press fitted to the second connection end portion of the crawler links and an inner cylinder portion to which said stationary bush is press fitted;

a first seal inserted between an outer end portion of each of the support members and the opposing crawler links; and a second seal inserted between an inner end portion of each of the support members and the opposing rotating bushes.

2. A crawler device for a crawler vehicle as claimed in claim 1, wherein each of the support members includes an outer end portion thereof attached between said right and left rows of crawler links and said stationary bush, and an inner end portion thereof attached between the crawler links and said rotating bushes.

3. A crawler device for a crawler vehicle as claimed in claim 1, wherein said each support member is formed in a multi-step shaped ring provided with a flange portion and is in contact with an outer peripheral portion of said second seal.

4. A crawler device for a crawler vehicle as claimed in claim 3, wherein said each support member includes an outer end portion thereof attached between said right and left rows of crawler links and said stationary bush, and an inner end portion thereof attached between the crawler links and said rotating bushes.

5. A crawler device for a crawler vehicle as claimed in claim 1, further comprising a plurality of stop rings, wherein the right and left end portions of said pin, which overlaps and press fits the first connection end portion and the second connection end portion of said right and left rows of crawler links, are structured to accept said stop rings for preventing a slip away.

6. A crawler device for a crawler vehicle as claimed in claim 1, wherein said stationary bush is structured such that a first oil groove is formed in an outer diameter portion thereof on a side opposite to a side receiving a force applied from said drive wheel, and second and third oil grooves communicating with the first oil groove are formed in end portions of the stationary bush.

7. A track segment for a track band for a crawler vehicle, the track segment comprising:

at least two crawler links, each crawler link having a first connection end portion and a second connection end portion at opposing ends thereof;

a pin for connecting the first connection end portion of a first crawler link to the second connection end portion of a second crawler link;

a stationary bush fixed over the pin;

a rotating bush rotatably fitted over the stationary bush;

a support member having an outer diameter portion thereof fitted to the second connection end portion of the first crawler link, and having an inner cylinder portion thereof fitted to the stationary bush;

a first seal disposed between the support member and the first crawler link; and a second seal disposed between the support member and the rotating bush.

8. A track segment as claimed in claim 7, wherein the support member is formed in a multi-step shaped ring provided with a flange portion adjacent to the second seal.

9. A track segment as claimed in claim 8, wherein the support member has an outer end portion disposed between the first crawler link and the stationary bush, and has an inner end portion disposed between the connected crawler links and the rotating bush.

10. A track segment as claimed in claim 7, wherein the support member has an outer end portion disposed between the connected crawler links and the stationary bush, and an inner end portion disposed between the first and second crawler links and the rotating bush.

11. A track segment as claimed in claim 7, further comprising a stop ring fitted onto the pin for preventing disconnection of the first crawler link from the second crawler link.

12. A track segment as claimed in claim 7, wherein the stationary bush has an oil groove in an outer diameter surface thereof on a side opposite to a received driving force.

* * * * *